United States Patent
Nenadovich Del Rio (10) Patent No.: US 9,468,197 B2
(45) Date of Patent: Oct. 18, 2016

(54) COOLING PROCESS FOR CULTIVATED SALMON TO RAPIDLY INDUCE UNCONSCIOUSNESS DURING HARVEST

(76) Inventor: Miguel Nenadovich Del Rio, Santiago (CL)

( * ) Notice: Subject to any disclaimer, the term of this patent is extended or adjusted under 35 U.S.C. 154(b) by 412 days.

(21) Appl. No.: 13/702,905

(22) PCT Filed: Apr. 1, 2011

(86) PCT No.: PCT/CL2011/000025
§ 371 (c)(1),
(2), (4) Date: Feb. 18, 2013

(87) PCT Pub. No.: WO2012/129715
PCT Pub. Date: Oct. 4, 2012

(65) Prior Publication Data
US 2014/0007598 A1    Jan. 9, 2014

(51) Int. Cl.
*A22B 3/08* (2006.01)
*A01K 63/02* (2006.01)
*F25D 1/00* (2006.01)

(52) U.S. Cl.
CPC .............. *A01K 63/02* (2013.01); *A22B 3/083* (2013.01); *F25D 1/00* (2013.01)

(58) Field of Classification Search
CPC .... A01K 61/00; A01K 63/02; A01K 61/008; A01K 29/005; A01K 29/0005; A22B 3/083; A22B 5/0076; A22B 7/008
USPC .................. 119/200, 300; 426/327
See application file for complete search history.

(56) References Cited

U.S. PATENT DOCUMENTS

| | | | | |
|---|---|---|---|---|
| 4,832,972 A | * | 5/1989 | Toledo-Flores | A23B 4/0053 426/327 |
| 4,978,546 A | * | 12/1990 | Haram | 426/327 |
| 5,310,427 A | * | 5/1994 | Manome | A01K 63/02 119/201 |
| 2008/0216758 A1 | * | 9/2008 | Kim | A01K 63/02 119/221 |

OTHER PUBLICATIONS

Close et al., Recommendations for euthanasia of experimental animals: Part 2, 1997, Laboratory Animals, 31, pp. 1-32.*
Rose et al., "Can Fish Rose Really Feel Pain?", Fish and Fisheries, 15, 97-133, 2014.
Key, "Fish Do Not Feel Pain and Its Implications for Understanding Phenomenal Consciousness", Biol Philos, 2014.
Poli, "Farmed Fish Welfare-Suffering Assessment and Impact on Product Quality", Ital. J. Anim.Sci vol. 7 (Suppl. 1) 2008.
Welfare Regulations, Official Journal of the European Union, Nov. 18, 2009.

* cited by examiner

*Primary Examiner* — Lisa Tsang
*Assistant Examiner* — Magdalena Topolski
(74) *Attorney, Agent, or Firm* — Greer, Burns & Crain, Ltd.

(57) ABSTRACT

A cooling process for live salmon from breeding cages in the sea, using a cooling mixture consisting of ice and common salt in fresh water that is placed in a cooling tank mounted on a truck for the transport of the fish, wherein the process is constituted by the following steps:
  a) The input of the fish into the cooling tank, without transferring the seawater in which they were bred, which is at a temperature between −0.7 to −3.9° C. to cause their unconsciousness; and
  b) The transportation of the fish at this temperature to the slaughter plant.

This cooling process for live salmon respects the bioethical norms for achieving the death of fish with reduced suffering after rapidly inducing unconsciousness, allowing the production of high quality products.

5 Claims, 3 Drawing Sheets

COOLING PROCESS FOR CULTIVATED SALMON TO RAPIDLY INDUCE UNCONSCIOUSNESS DURING HARVEST

1. FIELD OF THE INVENTION

The present invention is a process for salmon harvesting that applies to breeding cages in the sea. In particular, it refers to a treatment for live salmon prior to their slaughter to ensure a humane death, i.e., with a minimum of stress. The procedure involves treating salmon in a cold aqueous medium that quickly induces unconsciousness, according to the norms of bioethics for the treatment of fish. Salmon that are harvested from breeding cages are placed into a mixture of ice and salt at a predetermined low temperature that causes them to become unconscious in under 5 minutes; this process induces unconsciousness in all fish, despite variable sizes, allowing them to be transferred to a slaughter plant without undergoing stress during transport and slaughter. This process results in the production of high quality products.

2. DESCRIPTION OF THE STATE OF THE ART

It is well known that fish possess specific mechanisms of behaviour and stress in response to adverse natural situations (Poli B. M., *Ital. J. Anim. Sci.*, 2009, 8(1), p. 139-160; Harper, C., Wolf, J., *ILAR J.*, 2009, 50(4), p. 387-396).

Some aspects of the practice of aquaculture impact the welfare of fish. The main factors that reduce the welfare of cultivated fish during harvest include those concerning the following: a) crowding; b) manipulation; c) transport; d) harvest management; and e) slaughter methods.

Crowding, Manipulation and Transport:

Factors such as crowding, the pumping of live fish, and the consumption of oxygen and the accumulation of $CO_2$ and $NH_3$ in the transport containers contribute to a significant increase in stress and a decrease in the welfare of fish. Transport generally induces stress in fish, and this requires a long recovery time. A decrease in temperature during transport is useful to induce a sedation effect. In 2004, the Scientific Panel on Animal Health and Animal Welfare provided a series of recommendations to ensure the welfare of fish during transport:

- Adequate availability of dissolved oxygen.
- No exposure to air during the loading and unloading procedures.
- An appropriate starvation time before transport, according to the species, size and water temperature.
- Well-equipped transport vehicles and the assurance of minimum physical contact with the animals.
- Appropriate monitoring of the water quality and of the condition of the fish.

Physical discomfort and confinement induce characteristic stress responses, such as an increase in cortisol and glucose, which could alter the resistance of the fish to infectious diseases in several cultivated species. Crowded fish are also more sensitive to additional acute stress factors. Proper handling of crowding problems requires careful manipulation; an evaluation of the water quality; the addition of oxygen to the water if the levels fall below a critical value of 6 ppm; and close monitoring of the behaviour and activity of the fish.

Harvest Management:

Interest in the welfare of fish, including at the time of slaughter, is becoming more important at both the consumer and the producer levels, from an ethical point of view and in terms of the quality of the product.

Pre-mortem procedures are critical for the welfare of farmed fish and should be performed appropriately to avoid unnecessary fear, suffering and pain.

The duration of the harvest process could be traumatic for cultivated fish because the process takes a long time and involves intense handling and crowding, causing a decrease in oxygen and leading to the beginning of the stress state that can affect the organoleptic properties of the flesh and the sanitary and market quality of the final product. Stress and exercise before death are linked to a reduction in the quality of meat, and this is mainly associated with pre-slaughter stress. In fact, the relative endocrine response suggests that changes occur well before the slaughter process begins, including increased consumption of glucose reserves, which causes modifications to the normal post-mortem process and a higher susceptibility to microbial attack. The stress experienced during the harvest and at the moment of death, added to the relative endocrine responses, can strongly influence post-mortem biochemical processes such as the rate of degradation of ATP, the beginning of rigor mortis, and the decomposition rate of the meat.

Slaughter Methods:

The methods for inducing death that cause prolonged agony in fish are very stressful and should be avoided.

The opinion of the Scientific Panel on Animal Health and Welfare of the EFSA, established in 2004, was that many existent commercial slaughter methods expose the fish to substantial suffering over a long period of time, and they recommended that the stunning/death stage be incorporated before bleeding or before the beginning of evisceration. More recently, the decision of the EU council, adopted legally in June of 2006, extends the regulation of the welfare of animals to the breeding of fish in the EU, and these developments could possibly influence the import of fish. Article 19 of the council, with respect to the emergency death, recognises that the killing methods used depend on the breeding system, the species, the size and the number of fish to be killed and that a rapid death for large quantities of fish should be considered. In any case, the methods used should cause immediate death or quickly induce a state of unconsciousness before death, or the fish should be anaesthetised or effectively stunned before being killed. Since 2008, several European countries have recommended against, for example, the classic method of cooling fish with ice.

Indicators of the effectiveness of the procedures that avoid prolonged stress are as follows: 1) the immediate and irreversible ceasing of breathing movements (opercular activity rhythm) and 2) the immediate and irreversible loss of the movement of the eyes (vestibule-ocular reflex, VOR), meaning that the eyes of a stunned/dead fish do not move when the fish is rotated.

It is clear that empirical and scientific investigation in this area is lacking. There is a need for increased scientific knowledge on which to base future guidelines and potential legislation.

It is important to recognise that physiological stress is not synonymous with suffering. The monitoring of stress and its effects, at a physiological level, could contribute in part to the general welfare of fish.

Responses to physiological stress can be divided into primary, secondary and tertiary responses.

The primary responses to stress include the following: 1) the rapid release of catecholamines (adrenaline and noradrenaline) from the chromaffin tissues (homologous to the mammalian adrenal medulla), and 2) the activation of the hypothalamic secretion factor of the pituitary adrenocorticotropic hormone that, in turn, promotes the secretion of cortisol by the interrenal tissue (homologous to the mammalian adrenal cortex).

The secondary responses to stress are characterised by the immediate reactions to these hormones at the haematic tissue level. These short-term adaptive responses (acute) do not cause extreme suffering or the need for hours of recovery.

The tertiary responses to prolonged stress (chronic) could, however, induce a significant reduction in the well-being of the animal and lead to long-term responses that negatively influence appetite, growth, reproduction and immune responses.

The behavioural responses of fish are easily observable and provide immediate information about the physical and biochemical changes that take place as a response to stress without the use of invasive techniques. Specific behavioural responses could be used as indicators of stressful conditions that can adversely affect the welfare of fish.

There are certain indicators that can be used to evaluate the stress and welfare of fish from a scientific and practical point of view, although none of them is perfect.

The best strategy for the reliable evaluation of the well-being of fish and its impact on the quality of the product is a multidisciplinary analysis that takes into consideration the main changes in significant indicators of the biochemical and physiologic processes ante-mortem and/or post-mortem. In this way, the behaviour can be an effective early and non-invasive indicator of well-being/suffering, even when this can rarely be directly assessed.

Fish can give responses to external stimuli such as the following:

The ability to maintain balance when the fish is rotated backwards;
Movement of the eyes following changes in the posture of the body with respect to the longitudinal axis;
A reaction to the prick of a needle on the head or tail;
A reaction to low voltage electricity.

The visual evoked response (VER) elicited by shining a flashlight directly in the eyes and the somatosensory evoked response (SER) are objective methods that indicate that a fish is in a state of unconsciousness.

However, simpler methods, that partly indicate if the fish is conscious or not are also useful; these include autonomous behaviour, such as gill movement and the vestibular ocular reflex (VOR).

Fish are capable of specific and unconscious behaviour, including physiological and hormonal responses, to stressful stimuli, and if the stress is intense and sufficiently extensive, this can be harmful for their health. Therefore, the objective should be to minimise and control the stress experienced by fish prior to and during slaughter.

It is important to study methods that can be used when it is not possible to instantaneously induce insensibility, with the objective that the animal should be unconscious and insensate until death. In particular, the improvement of handling procedures prior to death and of the slaughter method is required, not only from an ethical point of view but also because there is a close relationship between the welfare of fish, even during their death, and the quality of the final product.

The present invention is a means of rapidly obtaining a state of unconsciousness in salmon during harvest to reduce the stress or suffering experienced by the fish to a minimum.

Here, the current state of technical knowledge regarding such matters is considered, and the invention is further described.

In patent EP1293129 (2005), Fjaera, S. O., Skjervold, P. O. et al. describe a process and a plant for managing the breeding of fish from their entry into the plant until their slaughter. The fish are stimulated to move in the desired direction using their natural instincts by cooling the water where they are from the ambient temperature, decreasing the temperature gradually until it reaches approximately 10° C., which decreases the stress levels of the fish and reduces the processing time. The quality of the final product is also improved.

In this patent, it was clear that the small fish were cooled faster that the large fish. Additionally, depending on the temperature and the stress level of the fish, rigor mortis can occur sometime after the fish have been cooled. This invention provides a process to manage the fish through the following stages of manipulation:

1) When a temperature of 10° C. is reached, the fish are transported to land via an elevator system or a conveyor belt, upon which they are induced to swim; from the elevator or conveyor belt, the fish are taken to a cooling pond where they are cooled to a predetermined corporal temperature, usually 1° C. over a period of 20 to 100 minutes. Once the fish have reached the desired corporal temperature, they are exposed to carbon dioxide as an anaesthetic.

2) The head is cut, and they are driven to a bleeding pond, which has a water temperature 0.5 to 1° C. higher than the water of the previous cooling pond. The ponds have been embedded with equipment that adjusts the temperature of the cooling water using a pre-chilled water supply.

The combination of these manipulations leads to significant productivity gains during the slaughter process.

The temperature is measured using a temperature probe mounted in a needle that is placed in the muscle of the fish; measurements are taken in the muscle close to the spine, under the centre of the dorsal fin. Several groups of fish were measured by this method for periods of cooling from 17 to 131 minutes of duration. Dead fish had a cooling time of 25 to 57 minutes.

By performing this procedure in the cold at the indicated temperatures, a substantial improvement in the maintenance of the quality of the finished products is obtained, and this process offers greater assurance that the fish will not be manipulated after the onset of rigor mortis.

The uniform cooling of large and small fish, according to this invention, is achieved by pre-cooling the fish to a temperature of 8-10° C. in the fish reception pond.

In conclusion, this patent produces a cooling of the fish of between 1° C. and 20° C. in water with ice as the cooling agent and involves the in situ slaughter of the cooled fish after anaesthesia; they are not unconscious due to the effect of the temperature alone.

In 2005, Skjervold described a method in patent EP1284604 to produce meat products from fish by removing the main parts of the skeleton and then the pin-bones of the fish before the resolution of rigor mortis, during the pre-rigor and in-rigor phases.

The method involves keeping fish under conditions that retard the development of rigor mortis, maintaining a low temperature of approximately 5° C., and the removal of the pin-bones of the fish before the resolution of the rigor mortis to obtain the final meat products.

The conditions that retard the onset of rigor mortis include maintaining the fish at a low temperature before slaughter, close to 10° C., preferably 5° C. or below. Under these conditions, it is possible to manage rigor mortis and the removal of the bones of the fish during the slaughter process with high efficiency. Hence, cooling is a tool for obtaining high quality products.

In US patent application No. 20080286407, Po-Hsing Lee describes a method for producing fish meat that has a fresh colour. This method involves inducing a state of unconsciousness in live fish by blocking the conduction of nerve pulses through the nervous system of the fish; bleeding the fish and cutting pieces of meat from the fish while they are unconscious; sterilising the meat; placing the sterilised meat in an atmosphere free of oxygen to preserve its original colour; freezing the meat; and packing the frozen meat.

The state of unconsciousness is achieved using a pointed bar to cut the nerves in the spine of the fish in such a way that they are unable to move. The fish experience a deficiency of oxygen, leaving them unable to move.

Using this method, the processing time can be considerably shortened, ensuring the freshness of the meat. Because the treatment with nitrogen can be completed in just a few seconds, the meat from the fish can be isolated from the environmental air so that the natural white or rosy colour of the meat can be maintained. This is very different from the previous method that used carbon monoxide to enhance the colour and required a reaction time of about 40-60 minutes to accomplish the final effect. This whole process depends on the unconsciousness of the fish at the beginning of the harvest process. In this method, chemical compounds are not used as anaesthetics.

In patent EP0917823 (Middleton, A. and Kestin, S., 2001), a method and an apparatus are described for killing salmon and other farmed fish by means of a humane system.

The salmon are placed on a table where they are first stunned with a blow from a hammer mace, or they are placed in a bath with seawater saturated with $CO_2$. After the fish are stunned, they are killed and bled using a curved knife. The bleeding of the salmon and other fish is performed at the site of the cage culture. The cerebral death of the fish is believed to produce meat of better quality.

This method is considered a more humane means of death for the fish and includes the following steps:
a) making the fish move in a predetermined direction,
b) stopping the movement of the fish at a defined position,
c) maintaining the fish in this position using lateral, releasable means of retention,
d) stunning the fish with carbon dioxide,
e) killing the fish by hitting or with pneumatic or electrical stunners and then bleeding the fish, and
f) picking up the dead fish for butchering.

The fish can be placed in position for slaughter manually or with the aid of guide-walls or conveyor belt systems.

An aqueous medium of carbon dioxide is used to induce unconsciousness, and death is induced with stunners and a curved knife that penetrates the heart.

Patent GB2405073 (Saunders-Davies, C., 2006) describes an invention entitled Apparatus for Electrocution of Fish, where the application of an electric field is used to stun fish in the water and, at certain voltages, to kill them or at least leave them insensate for a certain period of time so that they die of suffocation in air before they recover consciousness. It is accepted that such an electrocution forms the basis of a humane death for fish.

The apparatus consists of a cylindrical drum with another concentric cylinder of smaller diameter, closed at both ends, placed in such a way that the fish enter the interannular space and are driven by the water flow that impels them towards an exit. Both walls of the concentric cylinders are independently connected to electrodes; the water serves as an electrolyte through which the fish pass. An a.c. voltage is applied to the electrodes to induce their unconsciousness or their death in the water, leaving the fish in that state after the exit, where they are processed. The current is 1000 Hz, and the voltage of approximately 2.5 volts for each 10 mm of separation of the electrodes.

This apparatus allows for the slaughter of fish that are in a controlled position, guided by the walls of the cylinders of the apparatus. The fish are isolated, the electrocution voltage is applied to the fish in the water, and then the electrocuted fish are removed.

Patent GB2421889 (Díaz, Jorge, 2006) describes a device for stunning fish that applies the traditional Japanese technique of "Ike-Jime" for the harvesting of salmon. This equipment consists of a stunning unit that delivers a blow to the head of the salmon by means of a cylinder impelled by compressed air; the piston of the cylinder has a sharp tip screwed to its end, which penetrates the skull of the salmon causing their cerebral death, while maintaining physiological functions, which improves bleeding and postpones the onset of rigor mortis. This method is described to produce a quick death for the salmon and to improve the quality of the texture of the final meat products.

Patent application WO2008017104 (Comandante, B., AU) describes a conditioning method to improve the quality of the meat in which live fish are exposed to a carbonic acid solution to induce a hibernation state. The method involves inducing a hibernation state in live fish when they are exposed to a carbonic acid solution prior to transport; transferring the live fish in an induced hibernation state into a container, which is adapted to maintain the fish in that hibernation state in non-aquatic conditions; and transporting them inside containers without water.

The hibernation state is induced by one treatment of between 5 and 20 minutes for fish from tempered seawater, after which they are transported. To prolong a state of low metabolism, fish normally require the use of anaesthetics to minimise the requirement for oxygen and avoid the abrupt movements that are responsible for the damage that fish experience in transport containers. This is avoided with the hibernation process.

An alternative to the use of carbonic acid for transporting fish under non-aquatic conditions is the use of milled coral, which, when is mixed with water, induces a hibernation state that reduces stress without adverse effects on the fish. It is assumed that the carbonate ($HCO_3^-$) of the coral is partially converted to carbonic acid ($H_2CO_3$), which induces the hibernation state in fish. Salmon, with an optimal environmental temperature of 10-12° C., prefer a hibernation temperature range of 0 to −2° C. To reach this range, the temperature is lowered gradually by 2-3° C. per minute.

The live fish are prepared prior to being transported under non-aquatic conditions. First, the fish are subjected to starvation for 48 hours inside container ponds, and then transferred to recirculating container ponds containing 30 liters of saline water at 18 ppt. From an initial optimal environmental temperature of 26° C., the temperature of the water is lowered by 4° C. per hour until the appropriate starting temperature of 6, 12 or 18° C. is obtained. To induce the temperature reductions, 500 grams of ice are introduced per 10 liters of saline water every 20-30 minutes. Every hour, readings of opercular movement per minute are made for each fish.

In a similar way, the movement of the fish was observed, focussing specifically on the dorsal and pectoral positions and the fins of the fish. Attempts were made to register the colour of the fish, the movement of the eyes and any stains in the body.

Data on the transport or storage of fish, under non-aquatic conditions, show a tendency towards decreased opercular movement over time, which is understood to improve the survival of the fish during transport or storage. Increased opercular movement is understood to indicate increased stress levels in the fish.

Cooling of live fish is commonly used prior to the slaughter of Atlantic salmon (Stevenson, P., *EFSA Journal*, 2008, p. 736); cooling is performed before the immersion of the fish in carbon dioxide or cutting the gills to preserve the quality of the meat. In some cases, this live cooling is performed rapidly, with fish going from the environmental temperature to around −1° C. to +1° C., which causes stress to the salmon according to EFSA. EFSA and other international organisations concerned with the well-being of salmon, both at harvest and during slaughter, suggest that live-chilling or cooling fish in ice or in ice with water up to −1° C. should be avoided.

However, the behaviour of fish, in response to lower temperatures of approximately −3.4° C. to −3.9° C., at which the fish reach unconsciousness is less than 5 minutes and the eventual stress to the fish is reduced, has not been determined. The current invention addresses this question.

In summary, the current literature shows that the harvesting of salmon depends on techniques for quickly stunning the fish and that cooling in a saline aqueous medium has only been performed at temperatures above −1° C.

The present invention deals with the induction of unconsciousness in the salmon; rapid cooling is performed until a temperature of −3.4° C. to −3.9° C. is reached; this method has not been reported before in the literature and constitutes a contribution to technical knowledge. This contribution is particularly significant because the experiments using this invention were performed in the field during a productive commercial harvest phase. This invention applies to large quantities of fish that are cooled simultaneously and is not an individual treatment that leads to negative effects on the salmon meat, either due to careless manipulation or because the fish must be treated quickly because of their tendency to escape from the commercial stunners.

3. SUMMARY OF THE INVENTION

The present invention is a process for treating live salmon from storage cages that will be harvested prior to their slaughter and will produce a humane death, i.e., with a minimum of stress. The salmon are treated in a cold aqueous medium that rapidly induces unconsciousness, according to the norms of bioethics for the processing of fish.

In this process, salmon are cooled in a mixture of ice and salt to a predetermined low temperature that induces a state of unconsciousness within 5 minutes. Fish of varying sizes, within a certain range, are all rendered unconscious by this process and can be transferred to a slaughter plant without experiencing stress during their transport and slaughter, resulting in high quality products.

The cooling process itself consists of the following stages: a) the entry of the fish into the cooling pond, without transferring the seawater in which they were cultivated; b) the homogenisation of the temperature of the salmon and the induction of a state of unconsciousness; and c) the transport of the cold and unconscious fish to the slaughter plant to obtain a high quality final product.

The unconsciousness of the salmon is verified in situ by standard methods involving the evaluation of reflexes such as the movement of the eyes, the opercular movement of breathing, swimming, equilibrium and the response of the fish to physical stimuli.

5. DETAILED DESCRIPTION OF THE INVENTION

The chilling experiments described here using water cooled with ice and salt were performed with salmon farmed in cages by the Trusal Company, in the town of Calbuco, Chile. The results correspond to field experiments and not laboratory experiments; therefore, they represent data obtained during a real salmon harvest (Atlantic salmon).

In these experiments, the minimum time required for a total of 380 salmon to reach unconsciousness when different fractions of them were exposed to different cooling temperatures was determined. For this purpose, the cooling effect of different temperatures was investigated to determine the optimal temperature and minimum time required to induce unconsciousness in salmon. The experiments were performed at the following five temperatures:
  i) −0.7° C.,
  ii) −1.0° C.,
  iii) −3.4° C.,
  iv) −3.5° C., and
  v) −3.9° C.

For each temperature, the reflexes of the salmon were measured at several time points after 5 to 90 minutes of chilling. The reflex measurements were used to determine the number of salmon that reached unconsciousness at the temperatures and times indicated in the tables of results, which are given for samples of salmon of different weights within a certain range.

The minimum chilling period of 5 minutes was used mainly because of the time required for the experimental handling needed to correctly observe the consciousness of the fish in the cooling media. The measured samples of salmon came from a random selection at the storage centre of the Trusal Company in Calbuco. It is assumed that the average weight of the salmon did not differ significantly among the samples exposed to the cold for different lengths of time. The experimental units consisted of fish from the cages that the company had in January 2011.

For these experiments, 10 samples of salmon (experimental units) were selected at random, for each duration of exposure to the cold and temperature level indicated in the tables below. Some experiments were repeated with different samples of salmon.

The field experiments with 380 analysed units were distributed as is indicated in Table 1.

Measurements of Unconsciousness:

For each salmon analysed, the following measurements were made:

Initial weight. The weight of each salmon was measured with a digital scale (Super-SS, model ACS-SS), and a labelled chip with a unique number was attached to make them easily traceable in the chilling medium throughout the experimental process.

Unconsciousness level. To determine the state of consciousness of each fish, the standard methodology described by Guidance Notes No. 5 "Humane Harvesting of Farmed Fish" from the Humane Slaughter Association (UK) in 2003 was used. This method is based on observing the reflexes of the fish following sedation by cooling, or another alternative method as reference. According to this standard method, the following characteristics are observed:

TABLE 1

The distribution of 380 salmon units into experimental groups by temperature and chilling time.

| Time of chilling (min.) | Temperature (° C.) | | | | | |
|---|---|---|---|---|---|---|
| | −0.7 | −1 | −3.4 | −3.5 | −3.9 | Total |
| 5 | — | 10 | 10 | 20 | 20 | 60 |
| 10 | — | — | 20 | 20 | 20 | 60 |
| 15 | — | — | 10 | 20 | 20 | 50 |
| 20 | — | 10 | — | 20 | 20 | 50 |
| 30 | — | — | 10 | — | — | 10 |
| 40 | — | 10 | — | — | — | 10 |
| 50 | — | 10 | 10 | — | — | 20 |

TABLE 1-continued

The distribution of 380 salmon units into experimental groups by temperature and chilling time.

| Time of chilling (min.) | Temperature (° C.) | | | | | |
|---|---|---|---|---|---|---|
| | −0.7 | −1 | −3.4 | −3.5 | −3.9 | Total |
| 60 | — | 10 | — | — | — | 10 |
| 70 | 30 | — | 10 | — | — | 40 |
| 80 | 30 | 10 | — | — | — | 40 |
| 90 | 30 | — | — | — | — | 30 |
| Total | 90 | 60 | 70 | 80 | 80 | 380 | eye roll,
regular opercular movement of the opercular (breathing),
swimming,
equilibrium and
response to physical stimuli imposed on the chilled fish.

Using these parameters, a matrix is used to record the reflexes of the salmon starting from the moment they undergo chilling, and from this data, the unconsciousness (U) or consciousness (C) of the cooled salmon is determined.

Below, the results of the field experiments are presented in Tables 2 to 9, according to the procedure previously described.

TABLE 2

Consciousness based on reflex measurements at a chilling temperature of −1.0° C. (05 Jan. 2011).

| | Sample 1 | Sample 2 | Sample 3 | Sample 4 | Sample 5 | Sample 6 | Sample 7 | Sample 8 | Sample 9 | Sample 10 |
|---|---|---|---|---|---|---|---|---|---|---|
| Weight (g) | 2,024 | 2,688 | 2,412 | 3,610 | 3,212 | 2,026 | 2,724 | 2,682 | 1,994 | 1,792 |
| 5 Minutes | C | C | C | C | C | C | C | C | C | C |
| Weight (g) | 2,714 | 2,910 | 3,534 | 2,344 | 3,340 | — | 2,828 | 2,304 | 2,290 | 1,902 |
| 20 Minutes | C | C | C | C | C | C | C | C | C | C |
| Weight (g) | 2,184 | 2,866 | 2.016 | 1,800 | 2,686 | 2,322 | 2,420 | 2,448 | 2,210 | 2,366 |
| 40 Minutes | C | C | C | C | C | C | C | C | C | C |
| Weight (g) | 2,306 | 1,656 | 2,806 | 2,916 | 3,546 | 2,294 | 2,528 | 1,824 | 1,630 | 794 |
| 50 Minutes | C | C | C | C | C | U | U | U | U | C |
| Weight (g) | 3,212 | 1,894 | 2,248 | 2,928 | 1,926 | 1,858 | 2,906 | 2,164 | 1,720 | 2,510 |
| 60 Minutes | C | C | U | C | U | C | C | U | U | U |
| Weight (g) | 1,268 | 2,518 | 3,056 | 2,630 | 2,470 | 3,126 | 2,182 | 1,780 | 2,448 | 2,112 |
| 80 Minutes | C | U | U | U | U | U | U | U | U | U | where:
C = conscious fish
U = unconscious fish
Here, each sample corresponds to one single fish From this table, it can be seen that a fish of 2,294 grs starts to show unconsciousness (U) after 50 minutes at −1.0° C.

TABLE 3

Consciousness based on reflex measurements at a chilling temperature of −0.7° C. (07 Jan. 2011).

| | Sample 1 | Sample 2 | Sample 3 | Sample 4 | Sample 5 | Sample 6 | Sample 7 | Sample 8 | Sample 9 | Sample 10 |
|---|---|---|---|---|---|---|---|---|---|---|
| Weight (g) | 1,924 | 1,966 | 1,844 | 3,588 | 2,222 | 1,368 | 2,498 | 1,904 | 2,260 | 3,016 |
| 70 Minutes | U | U | U | U | U | U | U | U | U | U |
| Weight (g) | 2,330 | 2,356 | 3,200 | 2,694 | 2,782 | 1,992 | 2,962 | 1,298 | 2,076 | 2,836 |
| 80 Minutes | U | U | C | U | U | U | C | U | C | C |
| Weight (g) | 2,472 | 2,282 | 2,556 | 2,206 | 3,274 | 3,300 | 2,852 | 2,988 | 2,584 | 3,028 |
| 90 Minutes | U | U | U | U | U | U | U | U | U | U |
| Weight (g) | 2,044 | 1,196 | 2,716 | 2,336 | 2,672 | 2,302 | 1,806 | 2,688 | 2,376 | 2,374 |
| 70 Minutes | U | U | C | U | U | U | C | U | C | C |
| Weight (g) | 3,062 | 2,750 | 1,544 | 1,800 | 2,532 | 2,194 | 2,168 | 2,790 | 1,980 | 1,438 |
| 80 Minutes | U | U | C | C | U | U | U | U | C | C |

TABLE 3-continued

Consciousness based on reflex measurements at a chilling temperature of −0.7° C. (07 Jan. 2011).

|  | Sample 1 | Sample 2 | Sample 3 | Sample 4 | Sample 5 | Sample 6 | Sample 7 | Sample 8 | Sample 9 | Sample 10 |
|---|---|---|---|---|---|---|---|---|---|---|
| Weight (g) | 1,742 | 2,352 | 1,660 | 2,344 | 2,580 | 3,254 | 1,700 | 3,116 | 2,246 | 2,700 |
| 90 Minutes | U | U | U | U | U | U | U | U | U | U |
| Weight (g) | 2,652 | 2,688 | 3,966 | 2,234 | 2,768 | 1,730 | 2,872 | 2,612 | 3,138 | 2,376 |
| 70 Minutes | U | U | U | U | C | U | U | C | U | U |
| Weight (g) | 1,900 | 2,758 | 2,578 | 2,310 | 3,196 | 1,462 | 2,816 | 2,178 | 2,770 | 1,562 |
| 80 Minutes | U | U | U | U | U | U | U | U | U | U |
| Weight (g) | 2,310 | 2,344 | 3,352 | 3,120 | 1,974 | 1,884 | 1,792 | 1,454 | 2,110 | 2,876 |
| 90 Minutes | U | U | U | U | U | U | U | U | U | U |

This table shows that at −0.7° C., most of the salmon become unconscious after relatively long chilling times compared with those shown in Table 2.

TABLE 4

Initial measurement of consciousness based on reflex measurements at a chilling temperature of −3.4° C. (12 Jan. 2011)

|  | Sample 1 | Sample 2 | Sample 3 | Sample 4 | Sample 5 | Sample 6 | Sample 7 | Sample 8 | Sample 9 | Sample 10 |
|---|---|---|---|---|---|---|---|---|---|---|
| Weight (g) | 3,298 | 4,334 | 3,614 | 1,794 | 1,292 | 2,220 | 2,304 | 3,452 | 2,196 | 1,996 |
| 10 Minutes | U | U | U | U | U | U | U | U | U | U |
| Weight (g) | 3,596 | 2,946 | 2,982 | 3,416 | 2,172 | 3,288 | 2,328 | 2,356 | 2,280 | 390 |
| 30 Minutes | U | U | U | U | U | U | U | U | U | U |
| Weight (g) | 1,900 | 1,770 | 3,204 | 2,934 | 2,588 | 766 | 2,846 | 2,372 | 3,678 | 2,198 |
| 50 Minutes | U | U | U | U | U | U | U | U | U | U |
| Weight (g) | 2,806 | 3,238 | 2,516 | 2,390 | 1,918 | 2,550 | 4,236 | 2,914 | 2,320 | 1,322 |
| 70 Minutes | U | U | U | U | U | U | U | U | U | U |

TABLE 5

Second measurement of consciousness based on reflex measurements at a chilling temperature of −3.4° C. (12 Jan. 2011)

|  | Sample 1 | Sample 2 | Sample 3 | Sample 4 | Sample 5 | Sample 6 | Sample 7 | Sample 8 | Sample 9 | Sample 10 |
|---|---|---|---|---|---|---|---|---|---|---|
| Weight (g) | 1,190 | 1,726 | 876 | 4,394 | 2,568 | 1,712 | 3,100 | 2,420 | 2,776 | 1,834 |
| 5 Minutes | U | U | U | U | U | U | U | U | U | U |
| Weight (g) | 1,282 | 2,636 | 936 | 1,946 | 1,120 | 2,370 | 1,400 | 3,786 | 3,300 | 3,404 |
| 10 Minutes | U | U | U | U | U | U | U | U | U | U |
| Weight (g) | 2,264 | 2,204 | 1,090 | 2,262 | 2,136 | 1,704 | 3,508 | 1,930 | 1,880 | 2,390 |
| 15 Minutes | U | U | U | U | U | U | U | U | U | U |

From Tables 4 and 5, it can be seen that at a chilling temperature of −3.4° C., all fish become unconscious within five minutes.

TABLE 6

Initial measurement of consciousness, based on reflex measurements at a chilling temperature of −3.5° C. (13 Jan. 2011).

|  | Sample 1 | Sample 2 | Sample 3 | Sample 4 | Sample 5 | Sample 6 | Sample 7 | Sample 8 | Sample 9 | Sample 10 |
|---|---|---|---|---|---|---|---|---|---|---|
| Weight (g) | 2,134 | 2,196 | 2,250 | 3,018 | 3,530 | 1,870 | 1,996 | 1,616 | 1,080 | 950 |
| 5 Minutes | U | U | U | U | U | U | U | U | U | U |
| Weight (g) | 1,060 | 2,390 | 2,392 | 3,060 | 1,526 | 736 | 2,142 | 1,076 | 2,360 | 2,298 |
| 10 Minutes | U | U | U | U | U | U | U | U | U | U |
| Weight (g) | 2,538 | 2,548 | 2,314 | 1,290 | 1,266 | 2,860 | 2,388 | 2,056 | 1,236 | — |
| 15 Minutes | U | U | U | U | U | U | U | U | U | U |
| Weight (g) | 2,658 | 1,326 | 2,532 | 2,458 | 1,262 | 2,364 | 2,592 | 912 | 2,254 | 2,154 |
| 20 Minutes | U | U | U | U | U | U | U | U | U | U |

TABLE 7

Second measurement of consciousness, based on reflex measurements at a chilling temperature of −3.5° C. (13 Jan. 2011).

|  | Sample 1 | Sample 2 | Sample 3 | Sample 4 | Sample 5 | Sample 6 | Sample 7 | Sample 8 | Sample 9 | Sample 10 |
|---|---|---|---|---|---|---|---|---|---|---|
| Weight (g) | 2,214 | 2,596 | 1,494 | 1,552 | 1,486 | 2,830 | 3,136 | 480 | 1,890 | 2,128 |
| 5 Minutes | U | U | U | U | U | U | U | U | U | U |
| Weight (g) | 1,620 | 1,440 | 2,726 | 2,150 | 1,262 | 2,572 | 2,548 | 2,356 | 2,228 | 1,248 |
| 10 Minutes | U | U | U | U | U | U | U | U | U | U |
| Weight (g) | 3,464 | 1,972 | 2,812 | 1,592 | 2,608 | 1,954 | 1,808 | 2,440 | 2,178 | 2,850 |
| 15 Minutes | U | U | U | U | U | U | U | U | U | U |
| Weight (g) | 2,350 | 2,000 | 1,748 | 2,344 | 2,368 | 2,296 | 2,650 | 2,704 | 2,514 | 1,880 |
| 20 Minutes | U | U | U | U | U | U | U | U | U | U |

From Tables 6 and 7, which correspond to duplicate experiments, it can be seen that at a temperature of −3.5° C., all fish become unconscious within 5 minutes, regardless of their weight.

TABLE 8

Initial measurement of consciousness, based on reflex measurements at a chilling temperature of −3.9° C. (14 Jan. 2011).

|  | Sample 1 | Sample 2 | Sample 3 | Sample 4 | Sample 5 | Sample 6 | Sample 7 | Sample 8 | Sample 9 | Sample 10 |
|---|---|---|---|---|---|---|---|---|---|---|
| Weight (g) | 2,294 | 1,918 | 1,864 | 2,060 | 2,010 | 978 | 3,704 | 2,464 | 2,874 | 1,480 |
| 5 Minutes | U | U | U | U | U | U | U | U | U | U |
| Weight (g) | 3,686 | 3,728 | 3,134 | 1,858 | 3,530 | 2,454 | 1,752 | 2,424 | 2,580 | 3,734 |
| 10 Minutes | U | U | U | U | U | U | U | U | U | U |
| Weight (g) | 2,032 | 2,186 | 2,386 | 2,520 | 1,598 | 1,916 | 2,038 | 1,562 | 1,800 | 1,846 |
| 15 Minutes | U | U | U | U | U | U | U | U | U | U |
| Weight (g) | 2,602 | 1,460 | 2,394 | 1,772 | 2,260 | 2,262 | 1,936 | 3,338 | 3,352 | 1,688 |
| 20 Minutes | U | U | U | U | U | U | U | U | U | U |

TABLE 9

Second measurement of consciousness, based on reflex measurements at a chilling temperature of −3.9° C. (14 Jan. 2011).

|  | Sample 1 | Sample 2 | Sample 3 | Sample 4 | Sample 5 | Sample 6 | Sample 7 | Sample 8 | Sample 9 | Sample 10 |
|---|---|---|---|---|---|---|---|---|---|---|
| Weight (g) | 2,706 | 2,308 | 2,252 | 2,352 | 2,856 | 1,530 | 2,830 | 2,964 | 2,962 | 4,402 |
| 5 Minutes | U | U | U | U | U | U | U | U | U | U |
| Weight (g) | 2,570 | 2,790 | 2,140 | 2,340 | 2,370 | 1,968 | 2,250 | 2,638 | 2,548 | 2,064 |
| 10 Minutes | U | U | U | U | U | U | U | U | U | U |
| Weight (g) | 2,900 | 1,356 | 1,364 | 2,316 | 2,966 | 2,038 | 2,730 | 3,088 | 2,218 | 1,680 |
| 15 Minutes | U | U | U | U | U | U | U | U | U | U |
| Weight (g) | 2,616 | 2,962 | 2,192 | 2,770 | 1,966 | 2,040 | 2,570 | 2,562 | 2840 | 2,114 |
| 20 Minutes | U | U | U | U | U | U | U | U | U | U |

Tables 8 and 9 show that at −3.9° C., all fish become unconscious, within 5 minutes, independent of their weight. Statistical Analysis of the Experimental Data. Non-Linear Regression Analysis. Assumptions of this Model:

It is assumed that the random component of the model follows a normal distribution with homogeneous variance.

A non-linear curve to describe the relationship between the temperature and the chilling time was fit to the experimental data. The final model with the best fit was an exponential model, described by the following equation:

$$t_i = \beta_0 \cdot e^{\beta_i \cdot T_i} \cdot e_i; i=1,2,3,4,5 \qquad (1)$$

where:

$t_i$ is the response variable that represents the chilling time by which 100% of fish reached unconsciousness.

$T_i$ is the explanatory variable that represents the chilling temperature used.

$\beta_0$, $\beta_1$ are regression coefficients.

$e_i$ represents random experimental errors with normal distribution; average, 0; and variance, $\sigma^2$.

Variance

Assumptions of the Variance Design:

The design used to compare the average weight corresponds to a variance analysis for designs of fixed effects. The validity of the inferences for this variance analysis requires the assumption of populations with the same variance. Levene's test for homogeneity of variances was used. Additionally, other critical assumptions were used for the purposes of statistical tests and the construction of intervals of trust that required normality of the errors. The model was applied for each time interval for which the salmon were exposed to cold.

Covariance

The final model that best represents the chilling experimental data is described using the following equation:

$$y_{ij} = \mu + \alpha_i + e_{ij}; i=1,2,3,\ldots,k; j=1,2,\ldots,n \quad (2)$$

where:

$y_{ij}$ is the response variable that represents the weight at each chilling temperature i=1, 2, 3, ..., k of the individual j=1, 2, ..., n $\mu$ is the global mean weight $\mu_i$ is the mean weight associated with the treatment j.

$E_{ij}$ are random experimental errors with normal distribution; average, 0; and variance, $\sigma^2$.

The null hypothesis, $H_0$, of the model is that the mean weights for the K treatment groups (based on chilling time) are the same. Thus, the null hypothesis is equivalent to the following expression:

$$H_0: \mu_1 = \mu_2 = \mu_3 = \ldots \mu_K = \mu \quad (3)$$

The alternative hypothesis is that at least one of the averages, $\mu_i$, differs from the rest. If this test showed that not all mean weights were the same, the cause of the difference would be determined using the Scheffé method.

Results and Discussion

Figure 1:
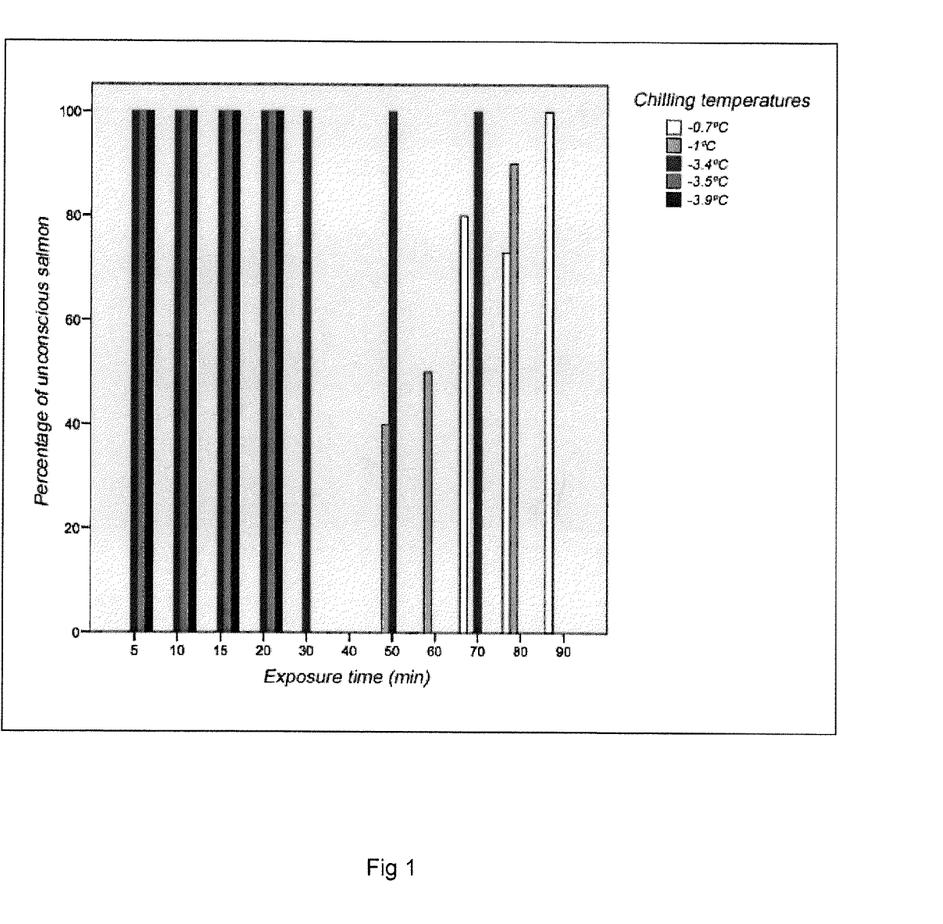
FIG. 1: The percentage of unconscious salmon by time and chilling temperatures.

The percentage distribution of the unconscious salmon (Table 10) shows that the lower the chilling temperature was, the shorter the time required for 100% of the samples to achieve unconsciousness. This was observed mainly at temperatures at or below −3.4° C. In contrast, at temperatures above −1° C., much longer chilling times were required for 100% of the samples to reach unconsciousness. These results are presented in FIG. 1.

Figure 2:
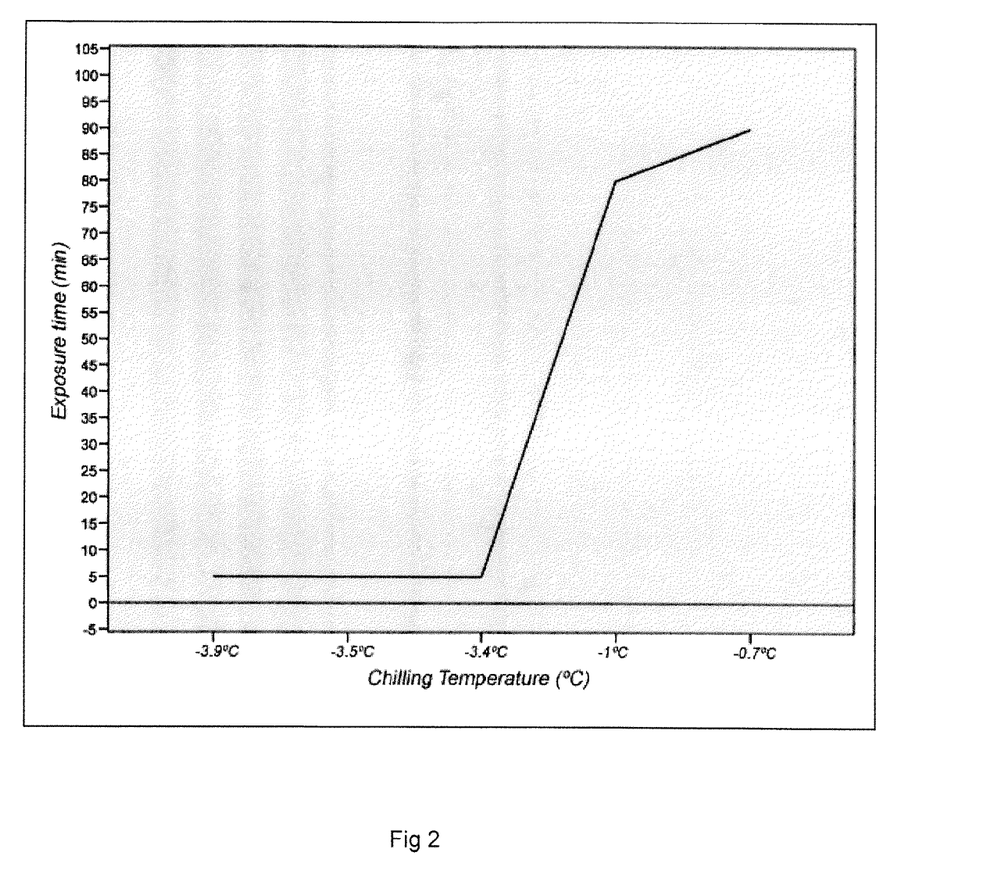
FIG. 2: The exposure time required for 100% of the sampled salmon to become unconscious, according to the chilling temperature.

FIG. 2 shows that 100% of the salmon reached total unconsciousness within 5 minutes, if the temperature was below −3.4° C., whereas if the temperature was increased to −1° C. or −0.7° C., 80 or more minutes of chilling was required for at least 90% of salmon to reach unconsciousness.

For the interval between −1° C. and −3.4° C., there was no interpolated information, which means it is impossible to determine with greater accuracy how the induction of unconsciousness is affected by the chilling temperature. However, it is possible to infer that the chilling time should decrease as the temperature decreases.

TABLE 10

The percentage of unconscious salmon by chilling time and temperature.

| Chilling time (min) | Temperature (° C.) | | | | |
|---|---|---|---|---|---|
| | −0.7 | −1 | −3.4 | −3.5 | −3.9 |
| 5 | — | 0% | 100% | 100% | 100% |
| 0 | — | — | 100% | 100% | 100% |
| 15 | — | — | 100% | 100% | 100% |
| 20 | — | 0% | — | 100% | 100% |
| 30 | — | — | 100% | — | — |
| 40 | — | 0% | — | — | — |
| 50 | — | 40% | 100% | — | — |
| 60 | — | 50% | — | — | — |
| 70 | 80% | — | 100% | — | — |
| 80 | 73% | 90% | — | — | — |
| 90 | 100% | — | — | — | — |

Figure 3:
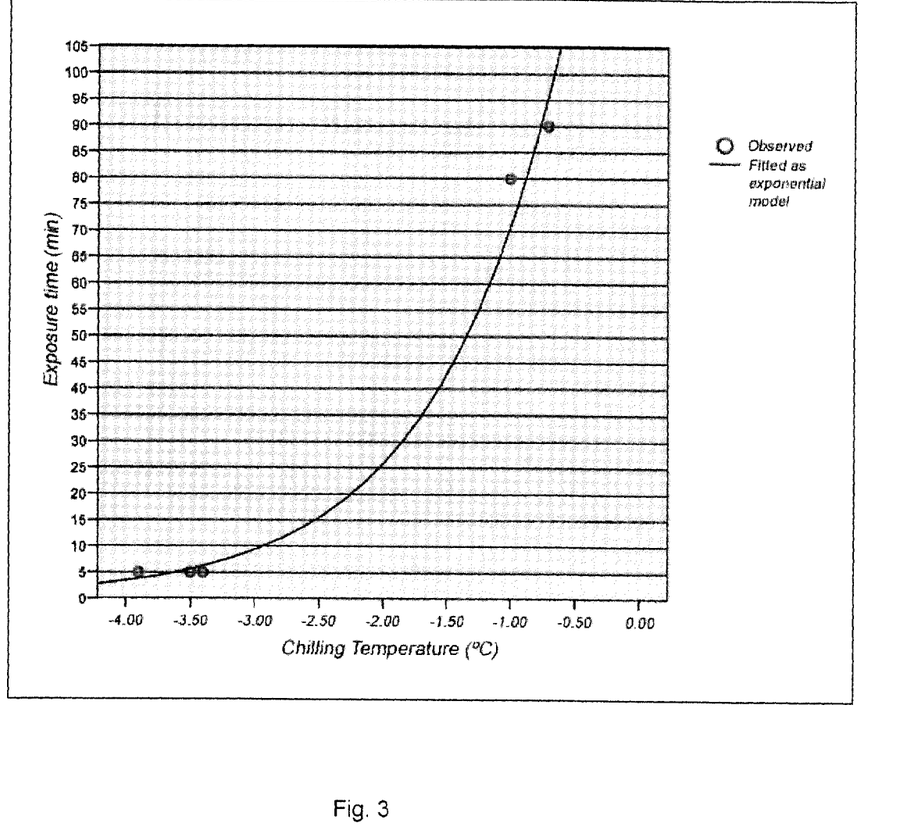
FIG. 3: An exponential model fitted to the experimental data.

Considering the previous assumption, an exponential model based on 5 points was fit to the data concerning the chilling time and temperatures (see FIG. 3). The final model is represented by the following equation:

$$\hat{t}_i = 194{,}308 \cdot e^{1{,}011 \cdot T_i}; \quad (4)$$

Table 11 shows the results of the Levene test for homogeneity of variances. This test showed that the equality of variances, which is required for ANOVA, was only rejected for the 10 minute exposure time; in all the other cases, the equality of variances was accepted. Consequently, the Tamhane non-parametrical statistical test, which does not require the assumption of equal variances, was used when the exposure time was 10 minutes.

TABLE 11

Levene's test for homogeneity of variances for exposure time to the cold.

| Time (min) | Levene statistic | gl1 | gl2 | Significance |
|---|---|---|---|---|
| 5.00 | 0.206 | 3 | 56 | 0.892 |
| 10.00 | 4.088 | 2 | 57 | 0.022 |
| 15.00 | 0.220 | 2 | 47 | 0.803 |
| 20.00 | 0.061 | 2 | 47 | 0.941 |
| 50.00 | 0.010 | 1 | 18 | 0.923 |
| 70.00 | 0.428 | 1 | 38 | 0.517 |
| 80.00 | 0.152 | 1 | 38 | 0.699 |

In Table 12, the ANOVA shows that for a 2.5% level of statistical significance, the average weight did not differ between any of the chilling times tested.

TABLE 12

Analyses of variance of the salmon weights for the chilling times.

| Time (min) | Square sum | gl | Square mean | Statistical index | Significance |
|---|---|---|---|---|---|
| 5.00 Intergroups | 3298796.9 | 3 | 1099599.0 | 2.028 | 0.120 |
| Intragroups | 30359684 | 56 | 542137.211 | | |
| Total | 33658481 | 59 | | | |
| 15.00 Intergroups | 79729.070 | 2 | 39864.535 | 0.124 | 0.884 |
| Intragroups | 15104141 | 47 | 321364.693 | | |
| Total | 15183870 | 49 | | | |
| 20.00 Intergroups | 1804027.3 | 2 | 902013.660 | 3.492 | 0.039 |
| Intragroups | 12141894 | 47 | 258338.177 | | |
| Total | 13945922 | 49 | | | |
| 50.00 Intergroups | 191296.80 | 1 | 191296.800 | 0.294 | 0.594 |
| Intragroups | 11700318 | 18 | 650017.689 | | |
| Total | 11891615 | 19 | | | |
| 70.00 Intergroups | 351433.63 | 1 | 351433.633 | 0.858 | 0.360 |
| Intragroups | 15561361 | 38 | 409509.512 | | |
| Total | 15912795 | 39 | | | |
| 80.00 Intergroups | 1732.800 | 1 | 1732.800 | 0.006 | 0.940 |
| Intragroups | 11601149 | 38 | 305293.389 | | |
| Total I | 11602882 | 39 | | | |

Table 13 shows that there are significant differences (p=0.006) when comparing the average weights of the groups chilled at −3.5° C. and −3.9° C. However, the average weight at −3.4° C. did not differ significantly from the average weights at −3.5° C. and −3.9° C.

Based on these results, the salmon samples used in the experiments came from a population with similar average weight, thus validating the consistency of the study.

TABLE 13

Results of the Tamhane test for 10 minutes of chilling time for salmon of different weights.

| Time (min) | (I) Temp. (° C.) | (J) Temp. (° C.) | Average Difference (I − J) | Typical Error | Significance | Confidence interval for 95% Lower Limit | Confidence interval for 95% Upper Limit |
|---|---|---|---|---|---|---|---|
| 10.00 | 3.40 | 3.50 | 474.50000 | 267.03853 | 0.234 | −197.3959 | 1146.3959 |
|  |  | 3.90 | −193.90000 | 263.35829 | 0.849 | −857.5515 | 469.7515 |
|  | 3.50 | 3.40 | −474.50000 | 267.03853 | 0.234 | −1146.3959 | 197.3959 |
|  |  | 3.90 | −668.40000* | 201.93706 | 0.006 | −1172.8060 | −163.9940 |
|  | 3.90 | 3.40 | 193.90000 | 263.35829 | 0.849 | −469.7515 | 857.5515 |
|  |  | 3.50 | 668.40000* | 201.93706 | 0.006 | 163.9940 | 1172.8060 |

*The difference in averages is significant at the 5% level

The statistical analysis of the experimental data from the harvest of salmon grown in seawater cages established the following facts:

The salmon exposed to temperatures of −3.4, −3.5 and −3.9 degrees Celsius became completely unconscious within 5 minutes.

The salmon used in the experiments came from a population with a similar average weight at the cultivation centre of the Trusal Company.

The results confirm that for salmon farmed in cultivation cages in the sea, live chilling to temperatures of −3.4° C. and below induced unconsciousness in 100% of fish within a very short time. While the earliest time tested in these experiments was 5 minutes due to experimental constraints, the actual time required to induce unconsciousness could be even lower.

Cooling fish from 0° C. down to −1.0 degrees produces stress over extended periods of time, which is one reason why this live chilling method is not used as a standard method of chilling.

The experiments to evaluate this invention have shown that at around 0° C., fish are indeed subjected to stress due to the delay of more than 30 minutes in reaching unconsciousness. The results now show that only at temperatures of −3.4° C. or below, unconsciousness is rapidly achieved, which strongly reduces the stress experienced by the fish. Therefore, this cooling method offers a more humane death, leading to meat products that are of better organoleptic quality.

The invention claimed is:

1. A cooling process for live salmon from breeding cages in the sea, using a cooling mixture consisting of ice and common salt in fresh water that is placed in a cooling tank mounted on a truck for the transport of the fish, wherein the process is constituted by the following steps:
   a) Placing the fish into the cooling tank, without transferring seawater in which they were bred, wherein the cooling tank is maintained at a temperature between −3.4° C. to −3.9° C. to cause their unconsciousness;
   b) Transporting the fish at this temperature to a slaughter plant.

2. The cooling process of claim 1, wherein the cooling mixture consists of 30 to 40% ice and brine manufactured with 5 to 15% salt in fresh water.

3. The cooling process of claim 2, wherein the process is performed at the temperature of −3.4° C. and the step of placing the fish in the cooling tank causes the fish to reach a state characteristic of unconsciousness within 5 minutes.

4. The cooling process of claim 3, wherein the step of placing the fish in the cooling tank causes the fish to reach a state characteristic of complete unconsciousness within 5 minutes.

5. The cooling process of claim 3, wherein the cooling process comprises a step of verifying the unconsciousness in situ by at least one of the methods selected from the group consisting of movement of eyes, opercular breathing movement, swimming, equilibrium and the response of the fish to physical stimuli.

* * * * *